Patented July 13, 1937

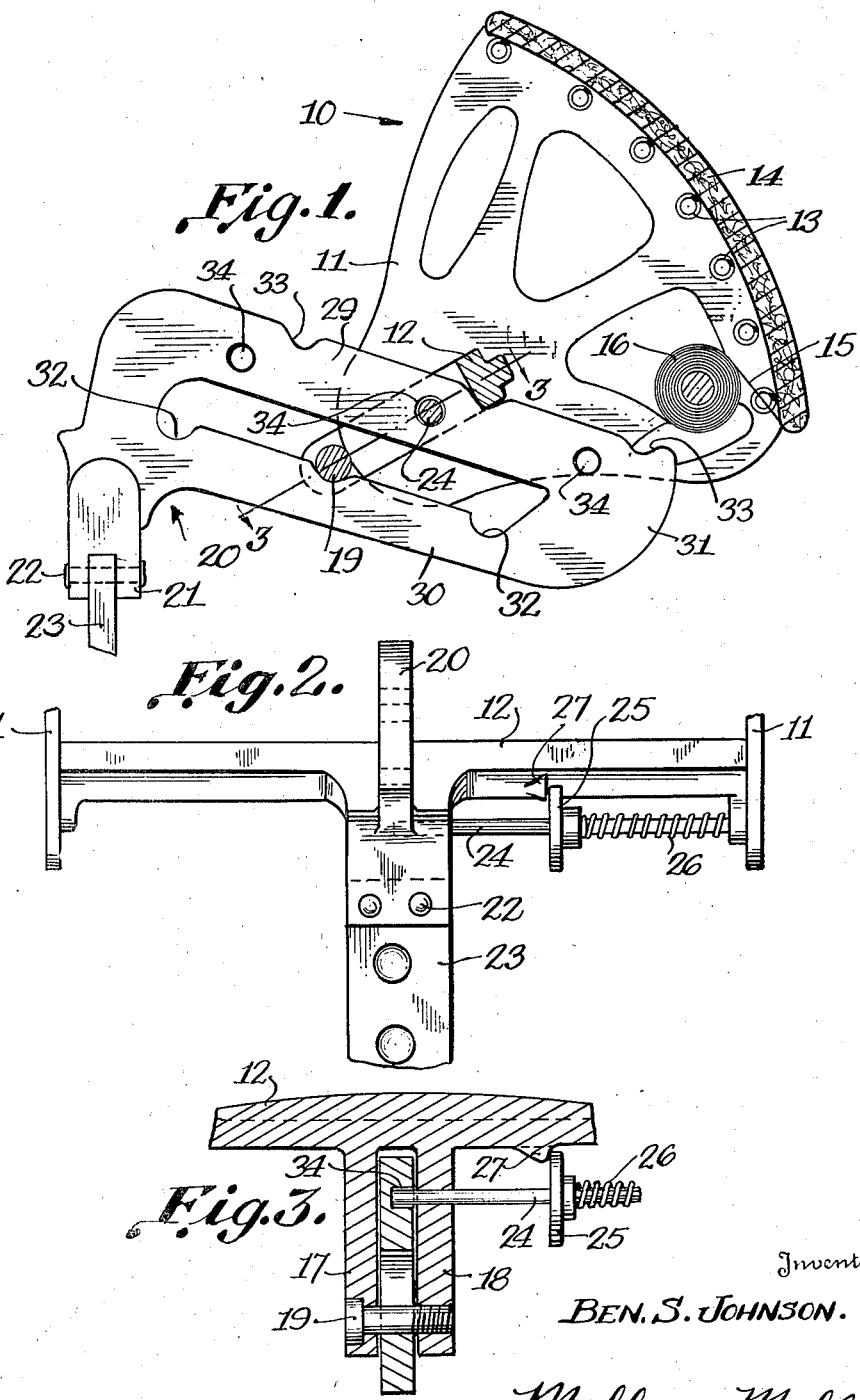

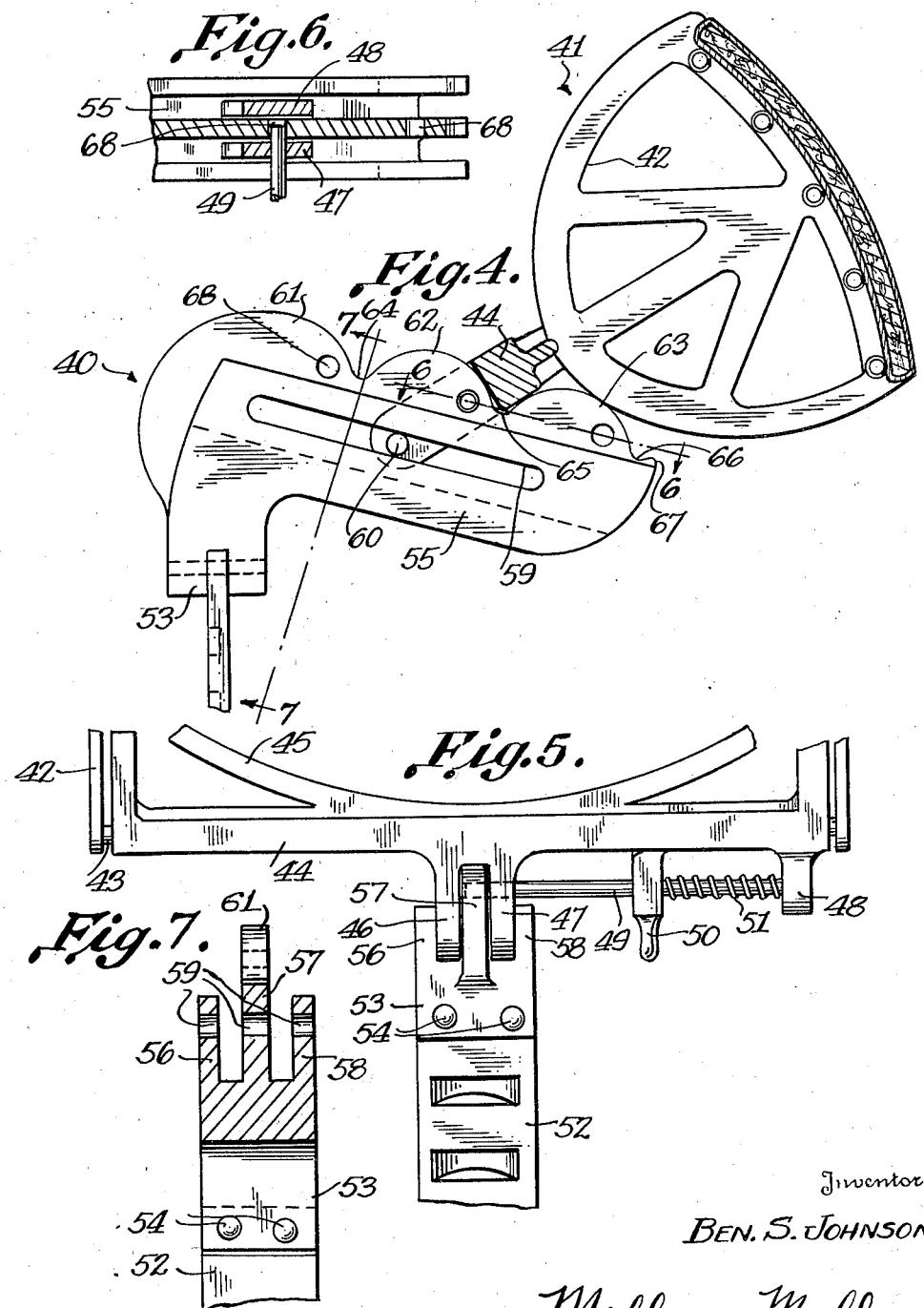

2,087,152

UNITED STATES PATENT OFFICE 2,087,152

CHAIR HEADREST ADJUSTING BRACKET

Bennie S. Johnson, Valley City, N. Dak.

Application November 19, 1935, Serial No. 50,571

4 Claims. (Cl. 155—177)

This invention relates to a chair headrest adjusting bracket and has for an object to provide an improved bracket for use on a barber's chair headrest.

An important feature of this invention is that the improved bracket of this invention permits the headrest to be adjusted forwardly and rearwardly toward and from the back of the barber chair while maintaining the preferred or desired angle in each position of adjustment.

The headrest adjusting bracket of this invention is shown in two forms altho other modifications may be made within the scope of what is hereinafter claimed. One form of this invention is shown as applied to the headrest illustrated in the two patents to Emmert 1,594,408 and 1,594,409 of Aug. 3, 1926, and the other form of the invention is illustrated as a part of the adjustable headrest disclosed in the patent to Schwarzkopf 1,860,058 of May 24, 1932. In each of these patents the headrest is illustrated as being pivotally mounted on a hub secured to the top of a vertically adjustable rack for mounting on the back of the barber chair. It is the particular feature of this invention to eliminate this hub at the top of the rack and to substitute a bracket permitting a transverse or horizontal adjustment of the headrest for an appreciable forward and rearward movement.

With the foregoing and other objects in view, as will hereinafter become apparent, this invention comprises the constructions, combinations, and arrangements of parts, hereinafter set forth, claimed, and shown on the accompanying drawings. In these drawings, Figure 1 is a side elevational view of one form of the adjusting means with the headrest position thereon.

Figure 2 is an elevational view looking from the left of Figure 1.

Figure 3 is a sectional view on line 3—3 of Figure 1.

Figure 4 is a side elevational view of another form of the adjustable mechanism with the headrest thereon partly in section.

Figure 5 is an end view from the left of Figure 4.

Figure 6 is a sectional view on line 6—6 of Figure 4, and

Figure 7 is a sectional view on line 7—7 of Figure 4.

There is shown at 10 some parts of a chair headrest substantially identical with that illustrated in the Emmert patents above referred to, this headrest 10 including opposing end plates 11, an angular bar 12, coiled springs 13 and the textile cover 14 over which may be drawn the strip of paper 15 from the roll 16. The angular bar 12 is provided with a pair of parallel lugs 17 and 18 adapted to receive the pintle 19 therethrough for securing the headrest to the bracket 20.

This bracket 20 is provided with a pair of vertically depending lugs 21 whereby it is riveted as at 22 to the top of the upright shank or rack 23 for vertical adjustment on the back of the barber chair.

For holding the headrest in adjusted position it is provided with a locking bolt 24 which has a washer or finger piece 25 secured intermediate its end. A spring 26 on the locking bolt 24 is placed between the washer 25 and the end plate 11 in which one end of the locking bolt 24 is supported, the other end of the locking bolt 24 extending to a perforation in the lug 18. A boss 27 on the angular bar 12 is provided in the path of the washer or finger piece 25 to limit movement of the locking bolt 24.

In the aforementioned Emmert patents the headrest pintle extends thru a hub secured to the top of the shank or rack, and the headrest may pivot about this pintle and be held in one of several possible positions by means of the locking bolt to provide a very limited horizontal motion. The fact that the headrest in the aforementioned patent is thus supported on a hub, however, about which it rotates as a center, eliminates almost completely any horizontal motion and merely causes the headrest to have a rotary motion about the pintle. With the bracket 20 of this invention, however, a substantial horizontal motion is provided for the headrest 10. The bracket 20 of this invention extends forwardly a substantial distance from the shank or rack 23 and is divided by a slot into an upper arm 29 and a lower parallel arm 30 which are connected at their forward ends by a leg 31. The lower arm 30 is provided with a plurality of spaced recesses 32, there being three spaced recesses 32 herein illustrated, one at each end and one at the middle, these recesses 32 extending from the slot 28. These recesses 32 each have a diameter corresponding the diameter of the pintle 19, the recesses 32 acting as beds for the pintle 19 when the headrest 10 is in one of its selected positions.

The upper arm 29 is provided with a plurality of appropriately spaced notches 33, there being one notch 33 for each recess 32 in the lower arm 30. Notches 33 are intended to receive the edge of the angular bar 12 as illustrated in Figure 1. The side of the upper arm 29 is provided with a corresponding plurality of appropriately spaced perforations or depressions 34 adapted to receive the end of the locking bolt 24.

In operation the headrest 10 may be adjusted horizontally by withdrawing the locking bolt 24 by means of the finger piece 25, and sliding the pintle 19 along in the slot 28 to the desired pintle recess or bed 32, the headrest 10 having been first rotated upwardly to withdraw the end of the angular bar 12 from its notch 33. Then with the pintle 19 placed in the selected position, the headrest 10 is allowed to pivot thereabout until the angular bar 12 enters the appropriate notch 33 and the locking bolt 24 enters the appropriate perforation 34, thus positively locking the headrest in the desired position.

In the form of invention illustrated in Figures 4 to 7 inclusive, the bracket 40 permits substantial horizontal adjustment of the headrest 41, the headrest 41 being of the particular type illustrated in the aforementioned Schwarzkopf Patent 1,860,058. In this form the headrest 41 has its end plate 42 secured by screws 43 to the bracket bar 44, the bracket bar 44 being provided with braces 45. The bracket bar 44 is provided with a centrally located pair of depending parallel lugs 46 and 47 and at its side with a third lug 48. A locking bolt 49 is provided with a finger piece 50 for operating it against a compression spring 51 between the lug 48 and finger-piece 50, the lug 47 being perforated to permit the end of the locking bolt 49 to extend therethru.

In the aforementioned Schwarzkopf patent the parallel lugs depending from the bracket bar are provided with a pintle which is pivoted in a hub while the locking bolt locks the headrest in different positions of adjustment about the hub, thus providing an angular or rotary adjustment but not a true horizontal adjustment. The bracket 40 of this invention is intended to permit a true horizontal adjustment of the headrest 41, the bracket 40 being secured at the top of the rack or shank 52 by means of a pair of depending lugs 53 riveted as at 54 to the shank or rack 52. The bracket 40 includes a horizontal arm 55 extending forwardly from the lug 53. Three parallel upstanding flanges 56, 57 and 58 extend along the length of the horizontal arm 55, and each of these upstanding flanges 56, 57 and 58 is provided with aligned straight parallel slots 59. A pintle 60 extending thru perforations in the lugs 46 and 47 is adapted to travel in the slots 59 of each of three flanges 56, 57 and 58 while the lower ends of the lugs 46 and 47 travel in the vertical grooves formed between the vertical flanges 56, 57 and 58. The outer flanges 56 and 58 are provided with straight upper edges, but the central flange 57 is provided with a plurality of humps 61, 62 and 63 thereby providing notches 64 and 65 between the humps 61 and 62 and between the humps 62 and 63 while a third notch 66 is provided by means of a lug 67 formed at the forward tip of the flange 57. Each hump 61, 62 and 63 is provided with a locking bolt receiving perforation 68.

In operation, the headrest 41 may be adjusted horizontally by first operating the finger piece 50 to withdraw the locking bolt 49 from its perforation 68, then rotating the headrest 41 about the pintle 60 as a pivot until the bracket bar 44 is above the top of the humps 61, 62 and 63. The headrest may then be moved forwardly or rearwardly as desired to bring the bracket bar 44 into the selected notch whereupon the finger piece 50 is released thereby locking the headrest 41 in the selected position.

As will be observed, both forms of the invention provide a headrest bracket permitting horizontal adjustment of the headrest whereby the headrest may be locked in the selected horizontal position.

The novel features and the operation of this device will be apparent from the foregoing description. While the device has been shown and the structure described in detail, it is obvious that this invention is not to be considered limited to the exact form disclosed and that changes may be made therein within the scope of what is claimed without departing from the spirit of the invention.

Having thus set forth and disclosed the nature of this invention, what is claimed is:

1. In a barber chair headrest having a supporting bar and pintle; a bracket supporting said headrest in a selected horizontally adjusted position, said bracket including a horizontally extending vertical arm, said vertical arm having a horizontal slot providing an adjusting path for the headrest pintle and a plurality of spaced notches on the top of said vertical arm providing seats for the headrest bar.

2. In a barber chair headrest having a supporting bar and pintle, and a locking bolt supported on depending lugs from said bar; a bracket supporting said headrest in a selected horizontally adjusted position, said bracket including a horizontally extending vertical arm, said vertical arm having a horizontal slot providing an adjusting path for the headrest pintle and a plurality of spaced notches on the top of said vertical arm providing seats for the headrest bar, and a plurality of correspondingly spaced locking perforations on said vertical arm to cooperate with the headrest locking bolt and hold the headrest in the selected position.

3. In a barber chair headrest having a supporting bar and pintle, and a locking bolt supported on depending lugs from said bar; a bracket supporting said headrest in a selected horizontally adjusted position, said bracket including a horizontally extending vertical arm, said vertical arm having a horizontal slot providing an adjusting path for the headrest pintle and a plurality of spaced notches on the top of said vertical arm providing seats for the headrest bar, and a plurality of correspondingly spaced locking perforations on said vertical arm to cooperate with the headrest locking bolt and hold the headrest in the selected position, said horizontal slot having a plurality of correspondingly spaced pintle seats formed therein.

4. In a barber chair headrest having a supporting bar and pintle, said bar having a pair of spaced depending lugs and a locking bolt slidably supported in alined apertures through said lugs; a bracket supporting said headrest in a selected horizontally adjusted position, said bracket including a horizontally extending vertical arm, said arm being provided with three upstanding flanges having alined horizontal slots providing an adjusting path for the headrest pintle, a plurality of spaced notches on the top of the central flange providing seats for the headrest bar, and a plurality of corresponding spaced locking perforations in the central flange to cooperate with the headrest locking bolt and hold the headrest in the selected position.

BENNIE S. JOHNSON.